Sept. 24, 1963 R. W. BENSON ETAL 3,104,872

EDGE DRAG DEVICE

Filed June 30, 1961 8 Sheets-Sheet 1

INVENTOR.
ROBERT W. BENSON
JACK O. WILSON
BY
[signature]
ATTORNEY

Sept. 24, 1963 R. W. BENSON ETAL 3,104,872

EDGE DRAG DEVICE

Filed June 30, 1961

8 Sheets-Sheet 2

INVENTOR.
ROBERT W. BENSON
JACK O. WILSON

BY [signature]

ATTORNEY

INVENTOR.
ROBERT W. BENSON
JACK O. WILSON
BY
ATTORNEY

Sept. 24, 1963 R. W. BENSON ETAL 3,104,872

EDGE DRAG DEVICE

Filed June 30, 1961

8 Sheets-Sheet 4

INVENTOR.
ROBERT W. BENSON
JACK O. WILSON
BY
ATTORNEY

Sept. 24, 1963 R. W. BENSON ETAL 3,104,872

EDGE DRAG DEVICE

Filed June 30, 1961 8 Sheets-Sheet 5

INVENTOR.
ROBERT W. BENSON
JACK O. WILSON

BY [signature]
ATTORNEY

Sept. 24, 1963 R. W. BENSON ETAL 3,104,872

EDGE DRAG DEVICE

Filed June 30, 1961 8 Sheets-Sheet 6

INVENTOR.
ROBERT W. BENSON
JACK O. WILSON
BY
[signature]
ATTORNEY

Sept. 24, 1963 R. W. BENSON ETAL 3,104,872

EDGE DRAG DEVICE

Filed June 30, 1961 8 Sheets-Sheet 7

INVENTOR.
ROBERT W. BENSON
JACK O. WILSON

BY [signature]

ATTORNEY

Sept. 24, 1963 R. W. BENSON ETAL 3,104,872

EDGE DRAG DEVICE

Filed June 30, 1961 8 Sheets-Sheet 8

INVENTOR.
ROBERT W. BENSON
JACK O. WILSON
BY
ATTORNEY 3,104,872

EDGE DRAG DEVICE

Robert W. Benson and Jack O. Wilson, Rochester, N.Y., assignors to Xerox Corporation, Rochester, N.Y., a corporation of New York Filed June 30, 1961, Ser. No. 121,082
3 Claims. (Cl. 271—61)

This invention relates to a sheet feed mechanism for use in a xerographic reproducing apparatus and in similar types of reproducing machines. More specifically, the invention relates to an edge drag device for use in the sheet feed mechanism of a reproducing machine, the edge drag device affecting a frictional retarding action on a stack of sheets to be fed one at a time, the edge drag device thereby facilitating the removal of only the topmost sheet of the stack.

Edge supports or edge drag devices are commonly used in sheet feed mechanisms to frictionally grip the side margins of a stack of sheet positioned in a sheet supply tray to aid in the control and alignment of the sheets as they are fed one at a time by a sheet separating and forwarding device.

Because edge supports or edge drag devices must be positioned on the sheet supply tray to be in frictional contact with the sides of sheets positioned therein in order to operate effectively to guide and grip the side margins of the sheets, they inherently are in a position to hinder the loading of a stack of sheets into the sheet supply tray.

It is therefore, the principal object of this invention to improve edge drag devices to facilitate the loading of a stack of sheets into a sheet supply tray.

Another object of this invention is to improve edge drag devices for holding sheets yieldingly in position on a sheet supply tray.

Still another object of this invention is to improve edge guides or supports for a stack of paper.

For a better understanding of the invention as well as other objects and further features thereof, reference is had to the following detailed description of the invention to be read in connection with the accompanying drawings, wherein.

Figure 1:
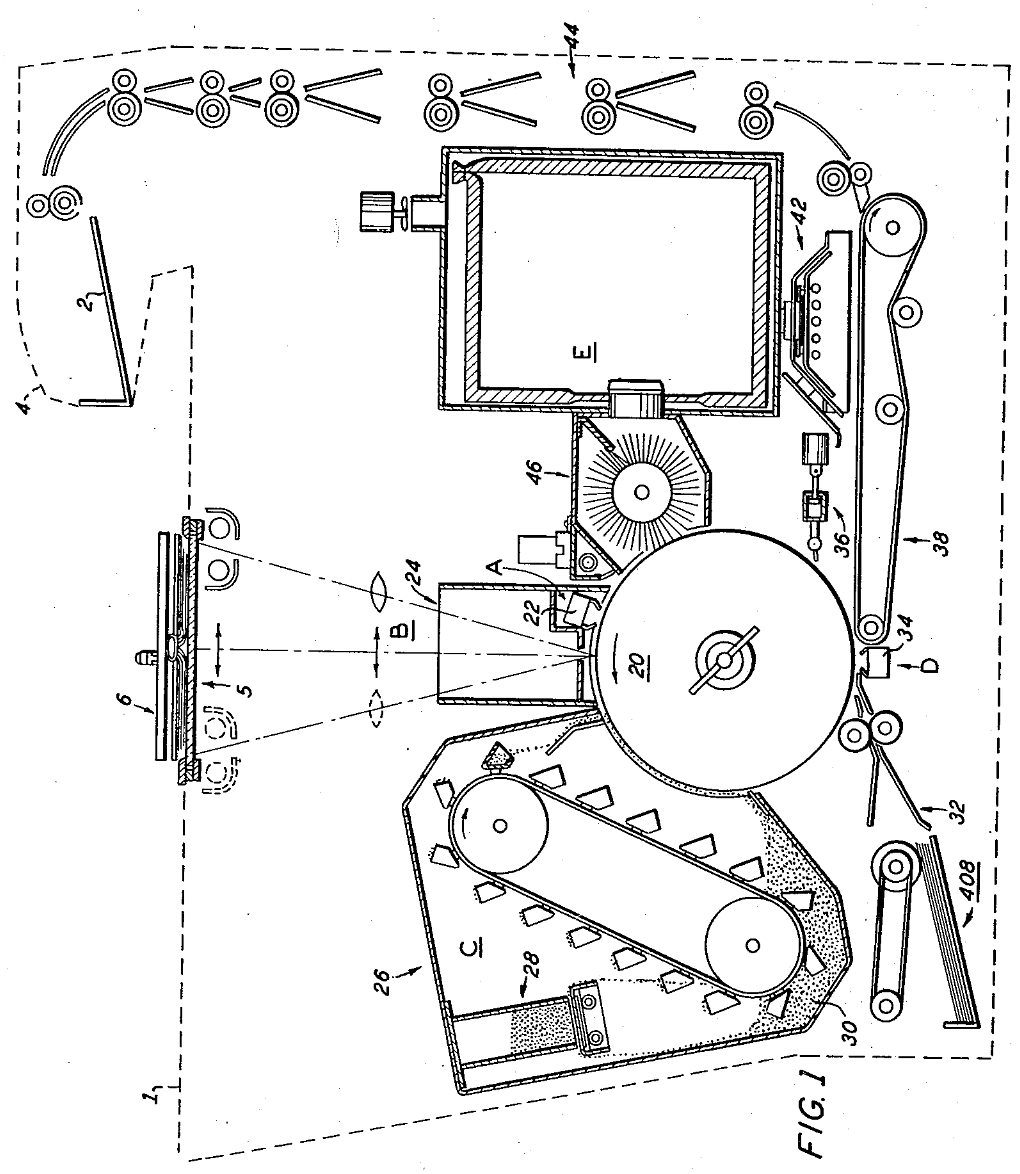
FIG. 1 illustrates schematically a xerographic apparatus adapted for continuous and automatic operation and incorporating a paper feed system for seriatim feeding of sheets of paper from a paper feed tray.
Figure 2:
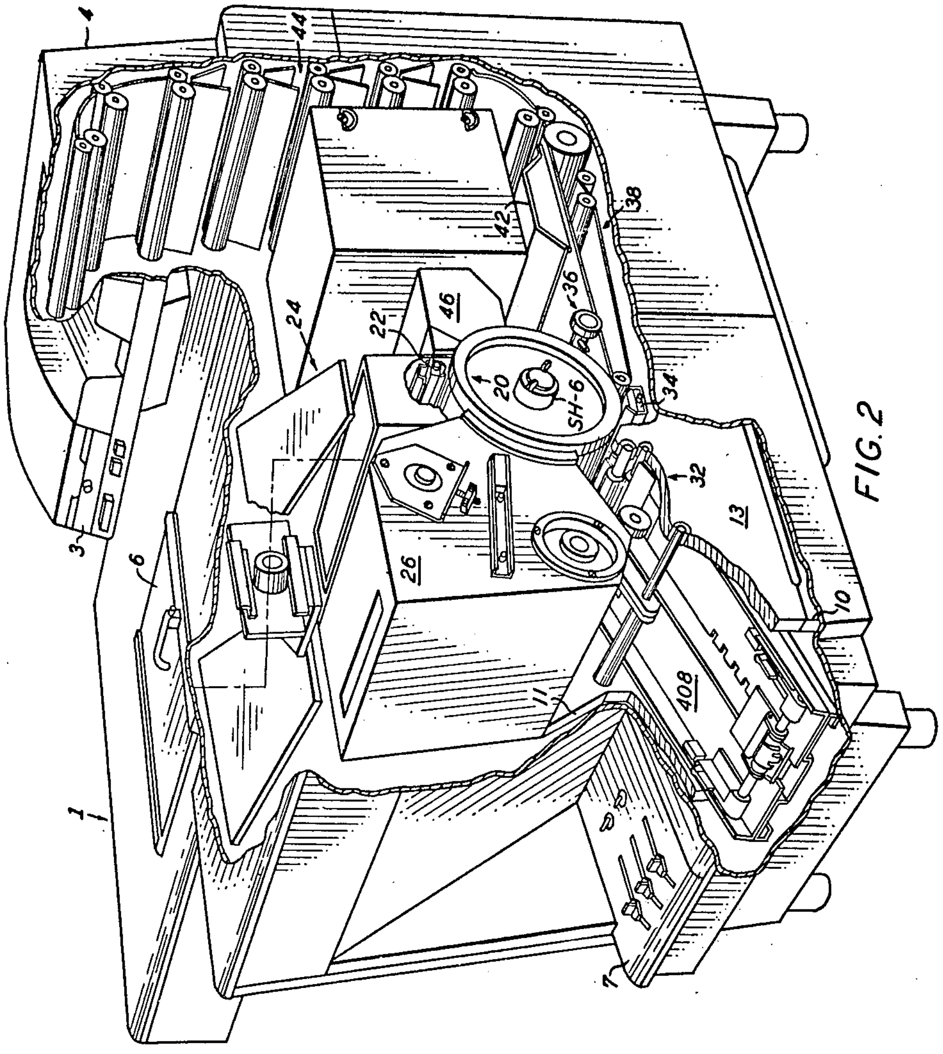
FIG. 2 is a right-hand perspective view of the xerographic apparatus with parts of the desk covering broken away to show the arrangement of the xerographic machine elements and a paper tray provided with edge drag devices of the invention.
Figure 3:
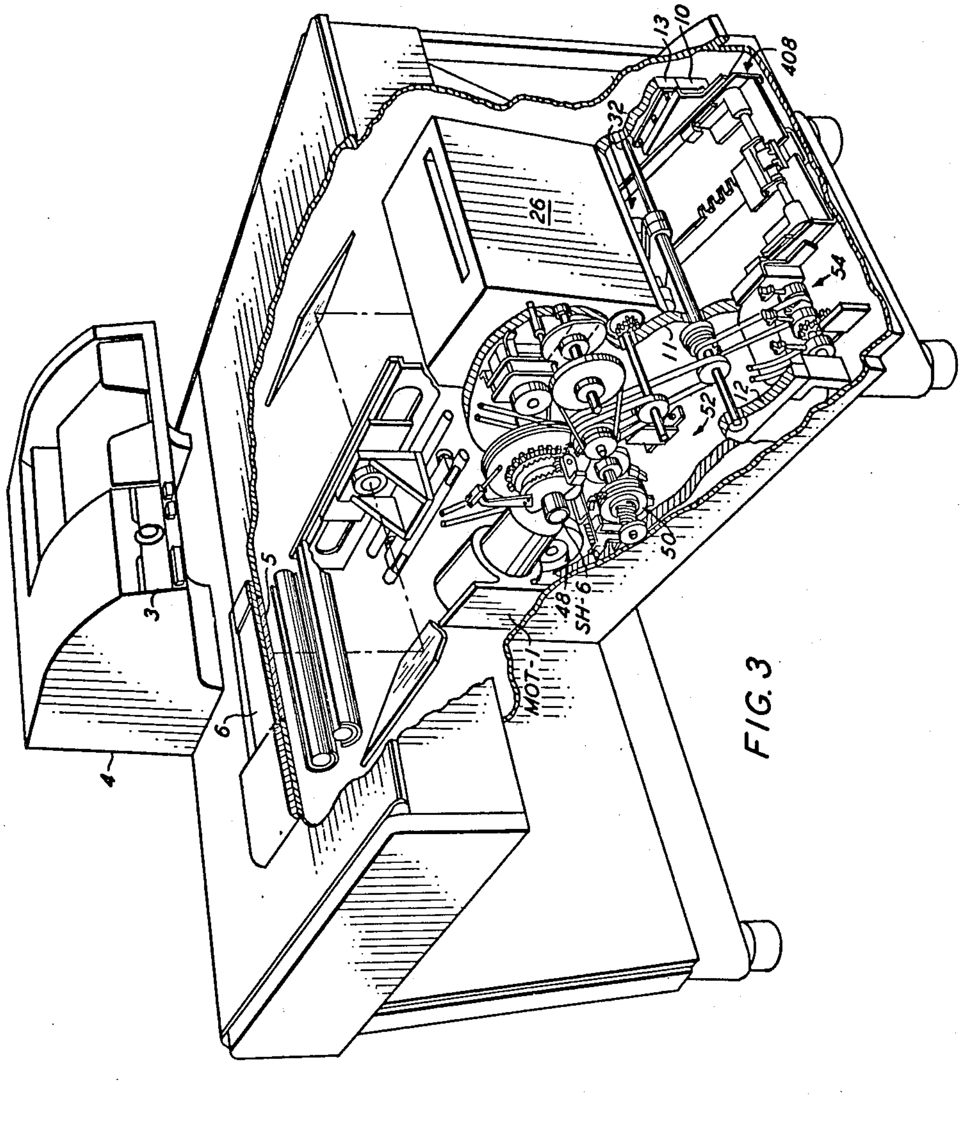
FIG. 3 is a left-hand perspective view of the xerographic apparatus with the parts of the desk covering broken away to show the arrangement of the xerographic machine elements and the paper feed tray.

Referring now to the drawings, there is shown in FIGS. 1, 2 and 3, a xerographic apparatus used for producing xerographic reproductions from a stationary original, the original being either transparent, translucent or opaque copy, whether in the form of single sheets, books, or in three-dimensional form. To conform to modern office decor the xerographic apparatus is adapted for installation in a suitable desk, constructed so that an operator seated at the desk may conveniently control all operations of the apparatus.

The desk, generally designated 1, constructed in a conventional manner, has mounted on the top and in the right-hand corner thereof a main control panel for initiating operation of the machine and for selecting and indicating the number of reproductions to be made, and a collecting tray 2 for finished reproductions, usually made on paper. Although the reproductions may be discharged from the apparatus for collection at any point accessible externally of the machine, it is preferred that the discharge terminal of the reproduction or paper feed means be embodied in a super-structure 4 overhanging the rear portion of the desk top, said super-structure also housing the main control panel 3 of the apparatus. Thus, the document holder or copyboard 5 and its covering platen 6 can be left unobstructed at the front part of the desk over the knee space.

In the lower right-hand corner of the desk is a second control panel 7 for additional control circuits and for levers to control the length of scan, to control the tensions of the paper separator rollers on a stack of paper to adjust for different paper weights, and for controlling the toner dispensing rate of the machine.

As shown schematically in FIG. 1, the xerographic apparatus comprises a xerographic plate including a photoconductive layer or light-receiving surface on a conductive backing and formed in the shape of a drum, generally designated by numeral 20, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A changing station, at which a uniform electrostatic charge is deposited on the photoconductive layer of the exrographic drum;

An exposure station, at which a light or radiation pattern of copy to be reproduced is projected onto the drum surface to dissipate the electrostatic charge on the drum surface in the exposed areas thereof and thereby form a latent electrostatic image on the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus or corona charging device 22 includes a corona discharge array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project a line copy image onto the surface of the photoconductive xerographic drum from a stationary original. To permit substantially any type of original copy, including books, magazines and other types of cumbersome three-dimensional objects to be copied for the reproduction of specific information contained thereon, the optical projection system shown is of the type disclosed in copending Mayo application, Serial No. 783,388, filed December 29, 1958.

The optical scanning or projection assembly, generally designated 24, comprises a stationary copyboard 5, which may consist of a transparent plate member such as, for example, a glass plate or the like positioned parallel to the top of the desk, which is adapted to support a master or original, such as book 18 placed face downward on its upper surface, the copyboard being uniformly illuminated and arranged in light-projecting relation to the moving light-receiving surface of the xerographic drum 20. Uniform lighting is provided by a pair of lamps attached to a slotted light reflector mounted for movement to traverse the plane of the copyboard.

A light shield adapted to protect the xerographic drum from extraneous light is positioned adjacent to the surface of the xerographic drum. A slot aperture in the light shield extends transversely to the path of movement of the light-receiving surface of the xerographic drum 20 to permit reflected rays from the copyboard to be directed against a limited transverse area of the light-receiving surface as it passes therebeneath. As shown, the light shield also encloses the corona charging device 22.

To enable the optical system to be enclosed within a conventional-size desk, a folded optical system including an object mirror, a lens, and an image mirror is used in the preferred embodiment of the apparatus.

The lens element positioned between the coypboard and the light shield is arranged for movement in a path to traverse the plane of the copyboard in timed relation to the movement of the light source, whereby the subject image of the original supported by the copyboard is scanned in timed relation to the movement of the light-receiving surface of the xerographic drum to project a light image corresponding to the subject image onto the surface of the xerographic drum.

Adjacent to the exposure station is a developing station C in which there is positioned a developer apparatus 26 including a casing or housing having a lower or sump portion for accumulating developing material 30. A bucket-type conveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser generally designated 28 of the type disclosed in copending Hunt application, Serial No. 776,976, filed November 28, 1958, now Patent No. 3,013,703, is used to accurately meter toner to the developing material.

Positioned next and adjacent to the developing station is the image transfer station D which includes suitable sheet feeding mechanism adapted to feed sheets of paper successively to the xerographic drum in coordination with the presentation of the developed image on the drum and the transfer station. This sheet feeding mechanism, generally designated 32, includes a sheet source such as a tray for a plurality of sheets of a suitable transfer material that is, typically, sheets of paper or the like, a separating roller 451 adapted to feed the top sheet of the stack through paper guides 492 and 493 to feed rollers 401 and 402 which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, suitable guides are positioned on opposite sides of the feed rollers.

The transfer of the xerographic powder image from the drum surface to the transfer material is effected by means of a corona transfer device 34 that is located at or immediately after the point of contact between the transfer material and the rotating drum. The corona transfer device 34 is substantially similar to the corona charging device that is employed at charging station A in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station there is positioned a transfer material stripping apparatus or paper pickoff mechanism, generally designated 36, for removing the transfer material from the drum surface. This device includes a plurality of small diameter, multiple outlet conduits of a manifold that is supplied with pressurized aeriform fluid by a pulsator operated by a suitable power means. The pulsator is adapted to force jets or pressurized aeriform fluid through the outlet conduits into contact with the surface of the drum slightly in advance of the sheet material to strip the leading edge of the sheet material from the drum surface and to direct it onto an endless conveyor 38 whereby the sheet material is carried to a fixing device, such as, for example, heat fuser 42, whereby the developed and transferred xerographic powder image on the sheet material is permanently fixed thereto.

After fusing, the finished copy is preferably discharged from the apparatus at a suitable point for collection externally of the apparatus. To accomplish this, there is provided a vertical conveyor, generally designated 44, by means of which the copy is delivered to a copy holder or collecting tray positioned in a suitable super-structure overhanging the rear portion of the desk top.

The next and final station in the device is a drum cleaning station E, having positioned therein a drum cleaning device 46 adapted to remove any powder remaining on the xerographic drum after transfer by means of a rotating brush and whereby the xerographic drum is flooded with light to cause dissipation of any residual electrical charge remaining on the xerographic drum.

To remove residual powder from the xerographic drum there is disposed a cylindrical brush rotatively mounted on an axle. For collecting powder particles removed from the xerographic drum by the brush, there is provided a dust hood that is formed to encompass approximately two-thirds of the brush area. To insure thorough cleaning of the brush a flicking bar is preferably secured to the interior of the dust hood adjacent the edge of the exhaust duct and in interfering relation with the ends of the brush bristles whereby dust particles may be dislodged therefrom.

For removing dust particles from the brush and dust hood, an exhaust duct is arranged to cover a slot that extends transversely across the dust hood and is connected to a filter bag in the filter box. A motor-fan unit, connected to a filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor-fan unit.

Any residual electrical charge remaining on the xerographic drum is dissipated by light from a fluorescent lamp mounted in a suitable lamp housing hinged to the dust hood, a starter being provided for energizing the fluorescent lamp.

Suitable drive means drive the drum, lens element, and slotted light reflector at predetermined speeds relative to each other and included are means to return the lens element and the slotted light reflector to their respective traverse starting positions and means to effect operation of the bucket-type conveyor, toner dispenser, endless conveyor, vertical conveyor; the separating roller and feed rollers being controlled in a manner to permit the feed of a sheet of transfer material into registered contact with the developed image on the xerographic drum as it is rotated through the transfer station. Stated in a different manner, a sheet of transfer material is advanced in time relation to the start of scan of the leading edge of a copy.

Referring now to FIGS. 2 and 3, there is shown the general arrangement of the xerographic apparatus within the desk 1. As shown, there is provided a frame for supporting the components of the apparatus formed by a base plate 10 to which are mounted full front and rear plates 11 and 12, respectively, and partial plate 13. The plates are connected together and maintained rigidly in spaced relation to each other by suitable tie plates, not shown.

As shown in FIG. 2, the xerographic drum 20 is mounted on horizontal driven shaft SH6 and the drum is positioned on the exposed front face of front plate 11, with the major xerographic components of the machine mounted around the drum either on the exposed front face of plate 11 or between plate 11 and partial plate 13.

The main drive elements and controls for the xerographic components are mounted between front and rear plates 11 and 12, respectively, as shown in FIG. 3, and they include as major components thereof, a main drive motor MOT–1, a scan control mechanism 48 for operating the movable elements of the optical system 24, a programmer 50 for actuating the operation of the paper feed system 32 and paper pickoff mechanism 36, a clutch mechanism 52 for effecting alternate operation of the separator and feed rollers in the paper feed system, and a lever control system 54 for adjusting the length of scan, toner dispensing rate, and separator roller tension.

It is believed that the foregoing description is sufficient for the purpose of this application to show the general operation of a xerographic apparatus. For further details concerning the specific construction of the xerographic apparatus shown, reference is made to copending Mayo et al. application, Serial No. 824,500, filed July 2, 1959, now Patent No. 3,062,109.

*Paper Feed System*

Referring now to the paper feed system, the sheet feeding mechanism 32, positioned in the image transfer station D, for seriatim feeding of cut-sheet transfer material into contact with the xerographic drum so that the developed powder images on the surface of said drum may be transferred to the transfer material, consists of a tray for holding a supply of cut-sheet transfer material, separator rollers for separating a single sheet of transfer material from said supply, feed rollers for feeding a single sheet into contact with the drum and means for coordinating the operation of the separator rollers and feed rollers to thereby feed a single sheet of transfer material into contact with the drum for proper registration of the powder image on the drum onto the transfer material.

Referring now to the specific subject matter of the invention, a supply of cut-sheet material that is, typically, sheets of paper or the like, to be fed one at a time to the feed rollers 401 and 402 is held in a paper tray 408 slidably positioned at the front of the machine between frame plates 11 and 13.

The paper tray, in the preferred embodiment, includes a base member 409 having angle plates 413 and 414 secured thereon, as by welding, the angle plates being positioned with their upright legs parallel to and adjacent the sides of the base member and with their lateral legs partially extending over the center channel of the base member to form a slot 415.

Sheets of paper or other material are positioned both longitudinally and laterally on the tray by means of margin guides 416 and 417 adjustably mounted on the tray by means of shaft 431 in a manner to be described. Each of the margin guides 416 and 417, formed complementary to each other, is provided with an upright side leg, an upright back leg at right angles to the side leg to guide the side and back edge, respectively, of the paper, and a lateral extending leg adapted to rest on the top of the paper tray.

The margin guides are adjustably positioned on the tray by means of a back guide assembly 418 adapted to be selectively positioned along the length of the tray. Back guide assembly 418 includes a back guide plate 419 adapted to ride on the top surface of the tray and is centered on the tray by means of a depending narrow bar portion of the back guide plate which is adapted to ride in slot 415. Leaf springs 421 secured to the bar portion retains the back guide plate 419 on the tray, while the left-hand edge of the bar portion is biased against the edge of left-hand angle plate 413 by means of leaf spring 422 secured at one end by screws 424 to the front of the back guide plate. The free end of the leaf spring 422 is guided by means of a spring guide 423 secured to the rear of the back guide plate by screws 424.

Figure 10:
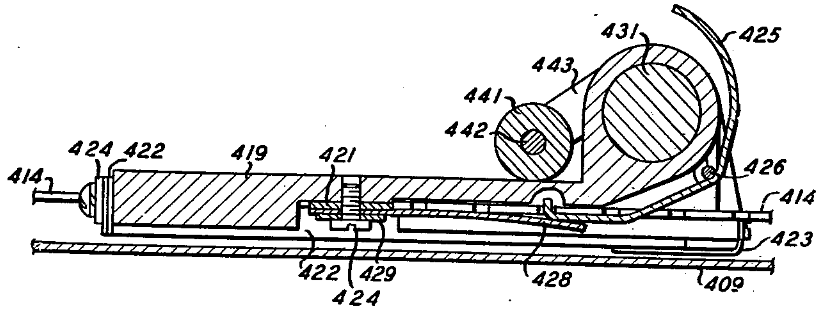
FIG. 10 is a sectional view taken along line 10—10 of FIG. 7.

To permit longitudinal positioning of the back guide plate on the tray, a latch 425 is pivotably mounted on a latch shaft 426 positioned in a suitable groove formed in the back of the back guide plate and secured thereto by shaft support blocks 427 secured by screws 424 extending through the shaft support blocks and threaded into the back guide plate. The latch 425 is provided with a leg portion, as seen in FIG. 10, adapted to slide into the notched or indented portions of the right-hand angle plate 414, whereby the longitudinal position of the back guide plate can be maintained as desired. The leg portion of the latch 425 is normally biased upward into locking position in a notched or indented portion of the angle plate by means of a latch spring 428 positioned normal to leaf spring 421, both springs being held in position by cover plate 429 secured by screws 424 to the underside of the back guide plate. When it is desired to move the back guide assembly the operator depresses the upper curved portion of the latch toward shaft 431 thereby pivoting the latch about latch shaft 426 to disengage the leg portion from the notched or indented portions of the right-hand angle plate 414.

Shaft 431 mounted in the bored portion of the back guide plate 419, and secured in alignment therein by suitable set screws, not shown, extends from opposite sides of the back guide plate to support the margin guides 416 and 417, which are suitably bored to slide on the shaft.

Figure 11:
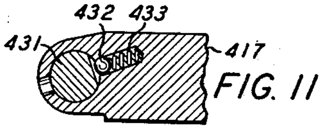
FIG. 11 is a sectional view taken along line 11—11 of FIG. 7.
Figure 8:
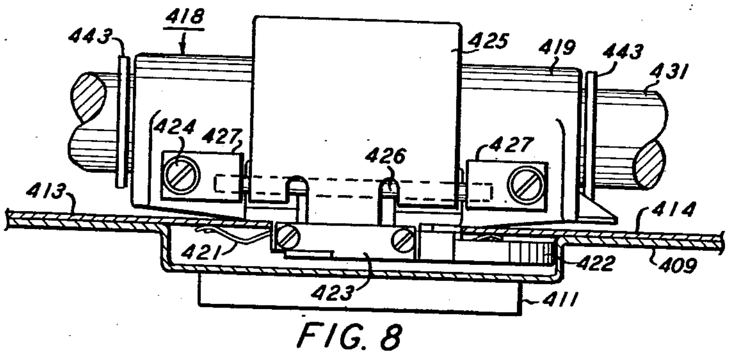
FIG. 8 is a sectional view taken along line 8—8 of FIG. 7.
Figure 9:
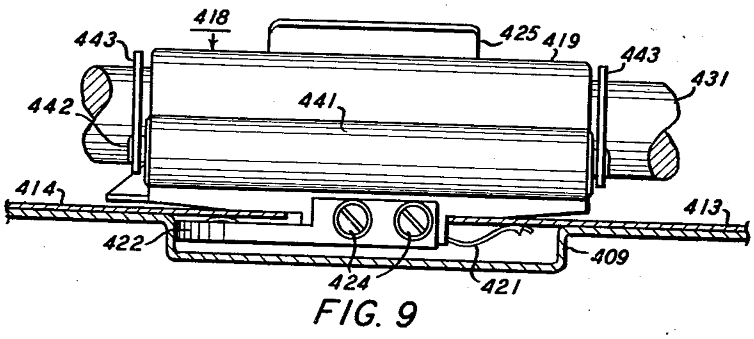
FIG. 9 is a sectional view taken along line 9—9 of FIG. 7.

To permit lateral adjustment of the margin guides, each of the margin guides is bored, as shown in FIG. 11, to receive a detent 432, in the form of a ball, which is biased by spring 433 into one of the suitably positioned notches formed in the shaft, whereby the margin guides can be readily indexed by the operator into the desired position for paper of various widths.

To aid an operator to quickly and correctly position a stack of paper in the tray, the shaft 431 is provided at opposite ends with two duplicate scales for lateral positioning of the stack, and the angle plate 414 is provided with a scale for longitudinal positioning of the stack, suitable index markers being provided on the margin guides and on the back guide plate for the convenience of the operator in determining the proper location of these elements.

Referring now to the subject matter of the invention there is provided on the paper tray improved edge drag devices for holding the paper yieldingly in position on the tray by engagement with the side edges of the stack of paper, for assisting in the control of the paper as it is fed by the feeding and separating rollers 451.

In the preferred embodiment shown, side frictional retention of the stack to permit single feeding of the sheets is obtained by means of friction or pressure pads 434, usually made of rubber or other suitable material, carried by the margin guides 416 and 417. The friction or pressure pads 434 are mounted in such fashion that they can be replaced whenever desired. Each pad is secured, as by cement, to a sheet metal carrier 435 having a bent upper hood portion adapted to be inserted through a suitable aperture in the bracket 436, whereby the carrier, with the pad thereon, is somewhat loosely secured to permit slight movement of the carrier to adjust the pad against the side margin of a stack. The bracket formed as a bent leaf spring, is secured at one end by screws 424 to the side of a margin guide with the free end of the spring extending beyond the front of the margin guide in position to normally bias the pressure pad against the side margin of a stack. To facilitate the placing or removal of a stack of paper on the tray there is provided a cam 437 on lever arm 438 loosely journaled in suitable slots formed in the side of the margin guide whereby the free end of a bracket 436 can be cammed away from the side of a stack of paper by rotation of the lever arm by means of lever 439 secured at one end thereof.

To further assure the feeding of sheets singly from the stack of paper, there is provided a drag roller 441, that is adjustably positioned, when in its operative position to rest on the topmost sheet of the stack. To obtain this result the drag roller 441 is rotatably journaled on axle 442 secured at opposite ends of the ends of a pair of arms 443 rotatably mounted on shaft 431 on opposite sides of the back guide plate. The drag roller, preferably made as a solid piece, because increased weight of this member is desired, is arranged in its operative position adjacent the rear end of the stack so that, as the trailing edge of the topmost sheet of the stack is advanced only a short distance from under the drag roller, the drag roller will be immediately effective to place a drag resistance on the next sheet to prevent its advance to any undesirable degree, by friction from the topmost advancing sheet. When a stack of paper is to be inserted into the paper tray, the drag roller is moved out of the way, to an inoperative position, by merely rotating the arms around the shaft 431.

To prevent the bottom sheet of the stack of paper from being inadvertently drawn forward by the feeding and separating rollers 451 pads 412 usually made of rubber or other suitable material are provided at the front of the paper tray.

Figure 4:
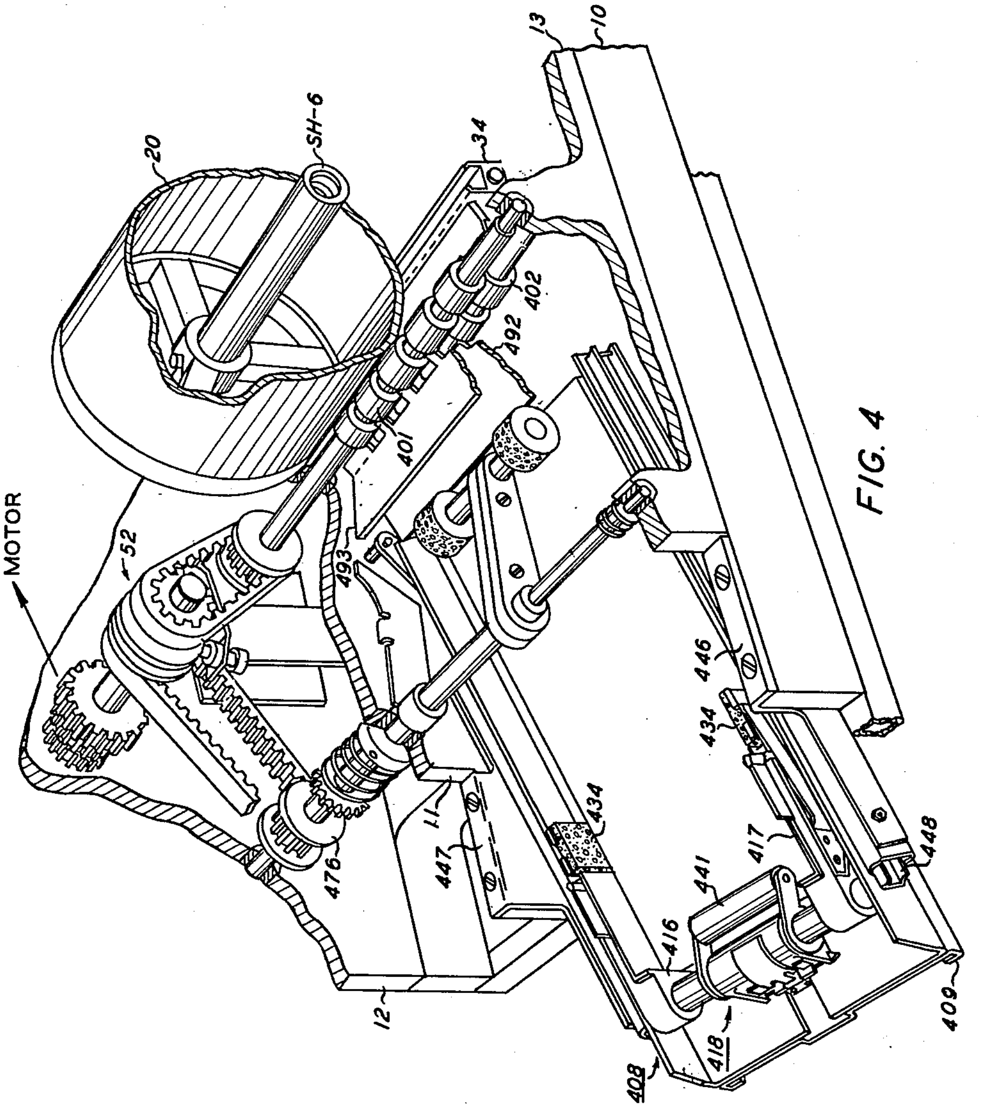
FIG. 4 is a right-hand perspective view, partly in section, of the paper feed mechanism of the apparatus including the paper feed tray and edge drag devices.
Figure 6:
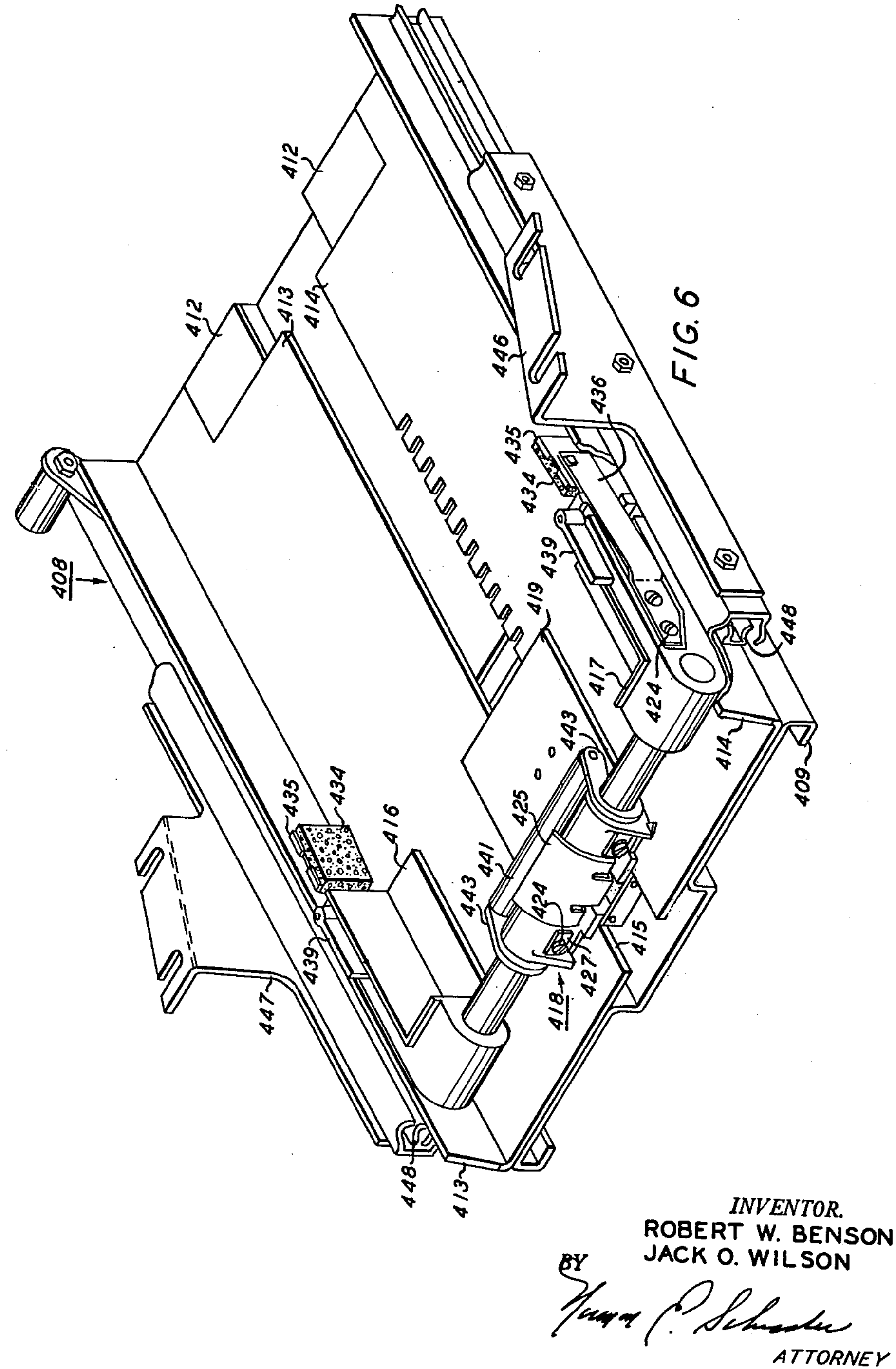
FIG. 6 is a right-hand perspective view of the paper feed tray removed from the xerographic apparatus.
Figure 7:
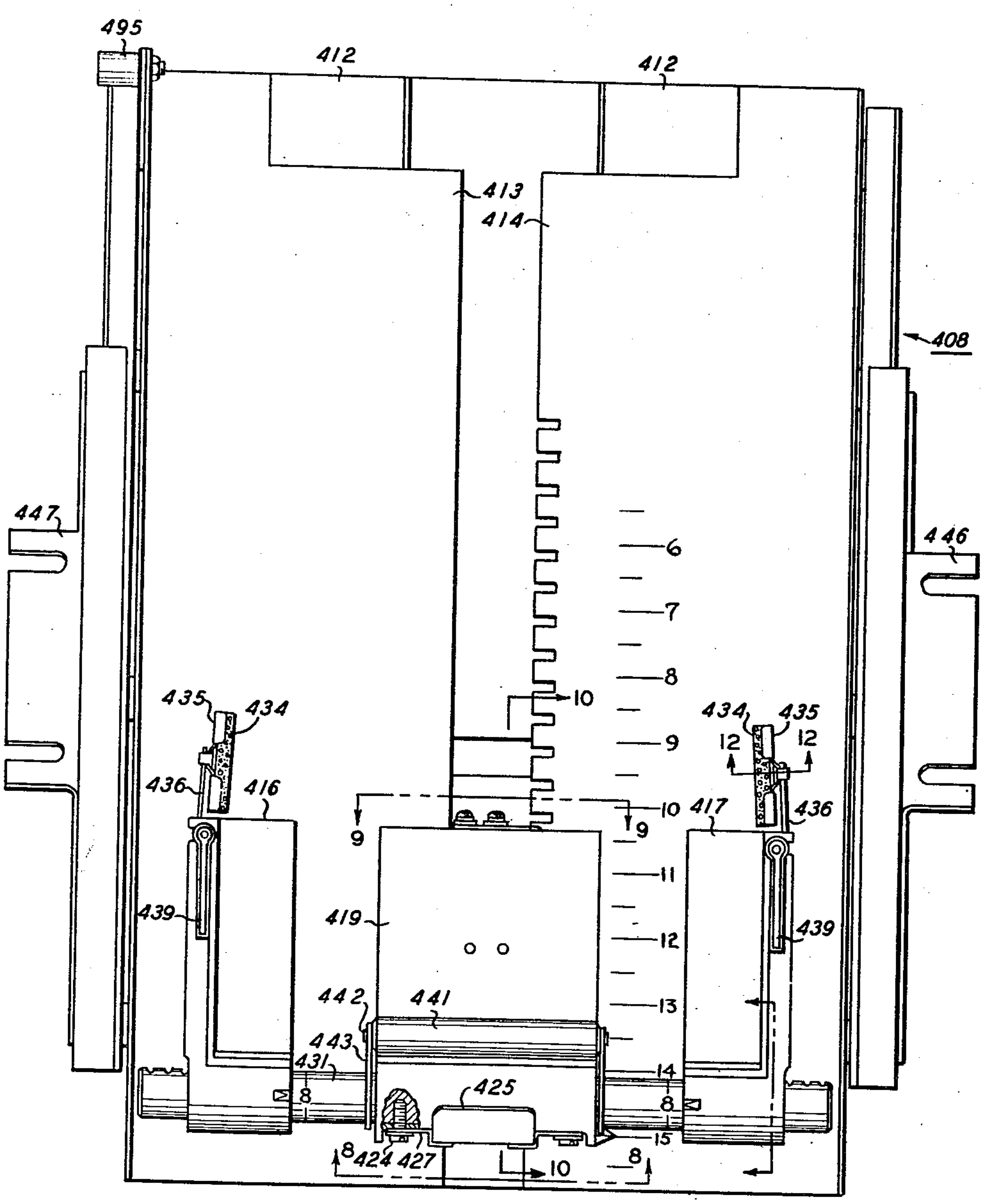
FIG. 7 is a top view of the paper feed tray.

Right-hand bracket 446 and left-hand bracket 447 connected to base plate 10 are adapted to support the paper tray assembly by means of a pair of commercial type drawer slides 448. As shown in FIGS. 4 and 6, the male portions of the slides are secured to the angle plates 413 and 414, and the complementary portions of the slides are secured to the brackets 446 and 447.

Figures 5, 12, 13:
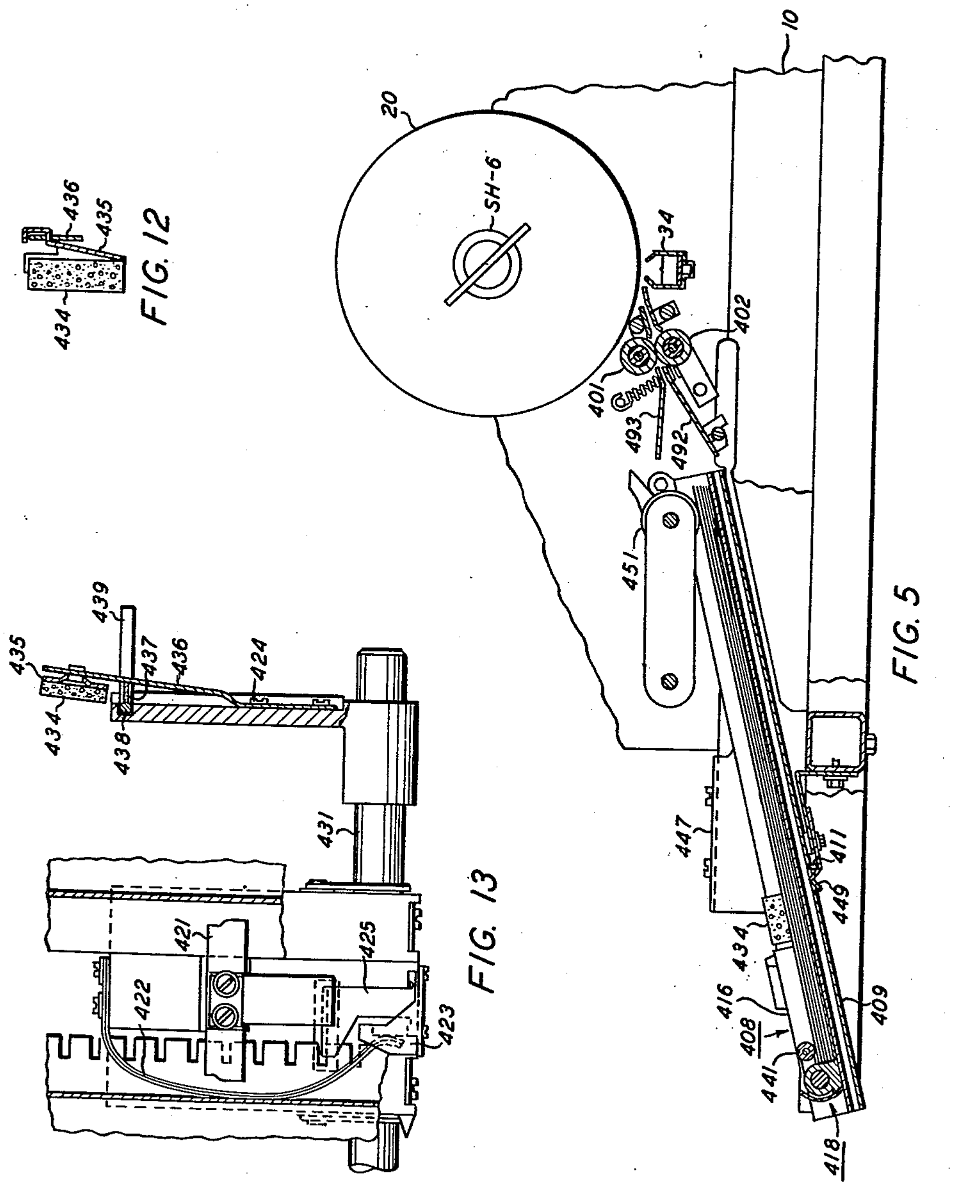
FIG. 5 is a side sectional view of the image transfer station of the xerographic apparatus and associated elements.
FIG. 12 is a sectional view taken along line 12—12 of FIG. 7.
FIG. 13 is a bottom view of a portion of the paper tray with parts broken away to show the arrangement of the back guide assembly.

As shown in FIG. 5, the paper tray is maintained in operative relation to the feeding and separating roller for seriatim feeding of sheets therefrom by means of a spring detent assembly 449 fastened to channel 14, forming part of the desk frame, positioned on the underside of base plate 10. The spring detent engages a depending leg 411 of the base member 409 of the paper tray.

Referring again to the subject matter of the invention, it is apparent that the edge drag device, as shown and described, is ideally suited for use in a reproducing apparatus or other type device which is adapted to make reproductions rapidly on various size copy material, such as paper. With the device of the invention, an operator can quickly and easily change to various size stacks of paper in the paper tray or to replenish the supply of paper.

While the invention has been described with reference to a preferred embodiment of the paper edge drag device disclosed herein, it is not confined to the details set forth since many modifications and changes will become apparent to those skilled in the paper feeding art. This application is intended to cover such modifications or changes as may come within the purposes of the improvements or the scope of the following claims.

What is claimed is:

1. An edge drag device for use in a paper feed apparatus wherein a stack of sheets are positioned for seriatim feeding of single sheets therefrom, said edge drag device including a margin guide adapted to be positioned adjacent a side of a stack of sheets to align the side margin of the sheets of the stack, a leaf spring having an end portion secured to said margin guide and an unsecured portion extending beyond said margin guide, a friction pad loosely secured to said unsecured portion of said leaf spring, and cam means mounted for movement in said margin guide and positioned intermediate the ends of said leaf spring whereby said leaf spring can be moved from a first position in which said leaf spring biases said friction pad into operative relation against the side margin of a stack, and to a second position in which said leaf spring carries said friction pad to an inoperative position in relation to a stack.

2. In a paper feeding mechanism, the combination of a table adapted to support a pile of sheets, means adapted by engagement with the top sheet of the pile to forward the top sheet from the pile, margin guides positioned on opposite sides of the table to align the side margins of the sheets forming the pile, at least one leaf spring having an end portion secured to one of said margin guides and an unsecured portion extending beyond said margin guide, a friction pad loosely secured to said unsecured portion of said leaf spring for applying a frictional braking effect to the sheets for holding them yieldingly against forward movement, and cam means rotatably mounted and positioned in said margin guide intermediate the ends of said leaf spring adapted when in one position to permit said leaf spring to bias said friction pad against the side margin of the pile and when moved in another position to hold said leaf spring in a second position to hold said friction pad out of operative relation with respect to the side margin of said pile.

3. An edge drag device for use in a paper feed apparatus wherein a stack of sheets are positioned for seriatim feeding of single sheets therefrom, said edge drag device including a margin guide adapted to be positioned adjacent a side of a stack of sheets to align the side margin of the sheets of the stack, a leaf spring having an end portion secured to said margin guide and an unsecured portion extending beyond said margin guide, an aperture in said unsecured portion, a sheet metal carrier loosely secured through said aperture in said unsecured portion of said leaf spring, a pressure pad secured to said carrier in position to engage the side margin of a stack of sheets, and cam means mounted for movement in said margin guide and positioned intermediate the ends of said leaf spring whereby said leaf spring can be moved from a first position in which said leaf spring biases said pressure pad into operative relation against the side margin of a stack, and to a second position in which said leaf spring carries said pressure pad to an inoperative position in relation to a stack.

References Cited in the file of this patent

UNITED STATES PATENTS

| | | |
|---|---|---|
| 2,226,003 | Levenbagen | Dec. 4, 1940 |
| 2,759,415 | Harris et al. | Aug. 21, 1956 |
| 2,797,638 | Miller | July 2, 1957 |
| 2,827,288 | Geisler | Mar. 18, 1958 |
| 2,986,391 | Walker | May 30, 1961 |